United States Patent Office 2,959,596
Patented Nov. 8, 1960

2,959,596
ARYL CHLORIDE-CYCLIC ETHER GRIGNARD REAGENTS

Hugh E. Ramsden, Scotch Plains, Allen E. Balint, Woodbridge, and Clarence K. Banks, Westfield, N.J., assignors to Metal & Thermit Corporation, Woodbridge Township, Middlesex County, N.J., a corporation of New Jersey No Drawing. Filed Nov. 22, 1957, Ser. No. 698,045

22 Claims. (Cl. 260—345.1)

This application is a continuation-in-part of our co-pending application Serial No. 549,560, filed November 28, 1955, now abandoned, which is in turn a continuation-in-part of our earlier applications, Serial Nos. 398,887 and 398,888, both filed December 17, 1953, now abandoned.

The present invention relates to a new and useful method of preparing aryl magnesium chloride complexes. These aryl magnesium chloride complexes are of great value as synthetic intermediates and undergo most of the characteristic reactions of Grignard reagents.

Aryl chlorides are relatively inert to magnesium and hitherto it has not been practical to form aryl magnesium chloride complexes by means of the usual Grignard reaction. In order to obtain aryl magnesium derivatives it has generally been necessary to use an aryl bromide or an aryl iodide. This results in a considerable increase in the cost of preparation of the desired aryl magnesium compound.

It is an object of the present invention to obtain aryl magnesium chloride complexes which may be prepared inexpensively from easily obtainable aryl chlorides.

It is also an object of the present invention to provide an inexpensive method for preparing aryl magnesium chloride complexes from easily available aryl chlorides.

Other and more detailed objects will be apparent from the following description and claims.

In accordance with the present invention it has been found that aryl magnesium chloride complexes may be formed by reacting the aryl chloride with magnesium in the presence of a compound Q hereinafter defined. The method of preparation consists of using the compound Q as a reactant and preferably also as solvent for the reaction in which the aryl chloride prerequisite is reacted with magnesium with or without standard activation.

The products of this invention are substituted or unsubstituted aryl magnesium chloride complexes and desirably substituted or unsubstituted carbocyclic aromatic magnesium chloride complexes having from 1 to 3 rings in the carbocyclic structure and not more than 48 carbon atoms. In the products the magnesium is attached directly to a carbocyclic aromatic ring. The products are preferably those described by the following general formula:

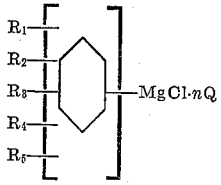

where $R_1$, $R_2$, $R_3$, $R_4$ and $R_5$ may be chlorine, fluorine and any other element or group not reactive with any of the reactants or reaction products, and include hydrogen and substituted and unsubstituted aliphatic radicals (including vinylic and allylic radicals), cycloaliphatic radicals, aliphatic and aromatic oxy radicals (e.g., alkoxy radicals, aryloxy radicals, allyloxy radicals, etc.), organosilyl radicals (e.g., triarylsilyl radicals), organostannyl radicals (e.g., trialkylstannyl radicals), organomercapto radicals (e.g., alkylthio radicals), organosulfuryl radicals (e.g., aryl sulfuryl radicals), diorganoamino radicals (e.g., dialkylamino radicals), diorganoboryl radicals (e.g., diarylboryl), diorganophosphinyl radicals (e.g., dialkyl phosphinyl), diorganoarsanyl radicals (e.g., diarylarsanyl), and diorganostibyl radicals (dialkyl stibyl), with the limitation that the substituting groups ($R_1$, $R_2$, $R_3$, $R_4$, $R_5$) may be substituted by functional groups not reactive with any of the reactants or reaction products, and where two or more adjacent carbon groups may be linked or condensed to form a cyclic or condensed aromatic ring, or a combination of the two. The nuclear chlorine atoms, i.e., those directly attached to the aryl radical, may range from 1 to 5 for each aryl radical. Q will be defined hereinbelow and n is a small indeterminate number of at least 1.

The length and size of the R groups is not critical, since by definition, the groups are not reactive with the reactants or reaction products under process conditions. However, with presently available materials it is not contemplated that hydrocarbon chains having more than 30 carbon atoms would be utilized as substituting groups.

Among the aryl magnesium chloride complexes forming the product of this invention are magnesium chloride complexes of the following aryl radicals: phenyl, tolyl, biphenyl (xenyl), terphenyl, naphthyl, anthracyl, chlorophenyl, phenanthryl, polychlorophenyl, polychlorobiphenyl, xylyl, 2(or 3, 4, 5, 6, 7 or 8)-phenylnaphthyl, anisyl, phenetyl, pyrenyl, cadalenyl, perylenyl, acenaphthalenyl, chrysenyl, picenyl, chlorotolyl, tetralinyl and so forth. It is thus clear that the term aryl as used herein includes biphenyl type radicals, fused ring radicals and polynuclear radicals.

The compound "Q" as used in this description and the appended claims means a cyclic ether containing 5 or 6 members in the ring with at least one hydrogen atom attached to each carbon atom in the ring and having the formula:

wherein X is a methylene group or NR" (R" being an alkyl group), R is an unsubstituted saturated divalent aliphatic hydrocarbon radical, R' is an ethylene radical, an ethylenically unsaturated divalent hydrocarbon radical or —CHR'" (R'" being hydrogen or an aliphatic radical), and O is oxygen. When X=NR", the ring shall contain 6 members with X and O in a position 1:4 with respect to each other. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. It is contemplated that compound Q may be substituted with groups which are not reactive with organomagnesium chlorides, or with any of the other components and products of the reaction mixtures of the present process. This includes substituted and unsubstituted alkyl, aryl, alkoxy and aryloxy groups (all allowable substitutes being those unreactive to other components of the reaction mixture as specified hereinbefore). Where nitrogen replaces a carbon atom in the ring at X, the nitrogen atom must be substituted with a group, such as an alkyl group, which is unreactive to the reactants or reaction products. One of the inherent properties of compound Q is that the oxygen is available for electron donation, i.e., the free p-electrons present on the oxygen are available for co-ordination with the aryl magnesium chloride. Any large blocking groups on the carbon atoms adjacent to the ring oxygen may impair the availability of these electrons and the reactivity of the compound for forming a complex and assisting in the reaction. In addition to the compounds listed above as being suitable for compound Q, other compounds satisfying the requirements for this complexing agent and solvent will be apparent to those skilled in the art from the teachings of the present specification and are intended to be considered as equivalents. Since compound Q also apparently functions as a solvent, a compound Q which has a high melting point may still function in this invention, but if it is used as solvent, obviously the high melting point (e.g., above 90° C.) causes great difficulty in carrying out the reaction.

The products of the invention are formed by the reaction of an aryl chloride with magnesium, in the presence of compound Q.

In one method for the preparation of the aryl magnesium compounds of the present invention, the aryl chloride is dissolved in the compound Q and the mixture is added to the magnesium. However, for some reactants initiation of the reaction is required and may be accomplished by suitable means such as the addition of a small amount of ethyl bromide and/or diethyl ether, an iodine crystal, etc. Another method of preparing the complex comprises dissolving a small amount of an aryl halide in compound Q, reacting this mixture with magnesium (initiating if necessary) and after the reaction commences, slowly adding the remainder of the aryl chloride. Excess amounts of compound Q (more than the theoretical 2 (or 1) moles required for complexing) are usually utilized in the process. This excess acts as a solvent. However, such excess amounts need not be used and excess aryl chloride could be utilized as the solvent. Another variation would consist in using an inert hydrocarbon as a diluent. In many cases an exothermic reaction proceeds immediately. In some cases it is necessary to heat at reflux to obtain a reaction. The reaction mixture is preferably agitated during the course of the reaction and an inert atmosphere, e.g., nitrogen which is cheapest, is preferably maintained. Yields obtained range upwards to 100%.

Using the compound Q as the reaction medium, the aryl magnesium chloride complexes formed are believed to contain at least one molecule of Q for each molecule of aryl magnesium chloride produced. Where the aryl magnesium chloride is produced in a reaction medium containing more than equal molecular amounts of Q, the number of molecules in the complex may be in excess of one. The maximum number of molecules of Q which may be present in the complex is difficult to ascertain. When the maximum is exceeded, Q is present as a solvent for the complex. Where more than one molecule of Q is present in the complex, e.g., 3 molecules, it is possible to distill off the molecules in excess of one by adding a high-boiling inert solvent, such as toluene, xylene, cumene or kerosene, and distilling. The last molecule of Q is bound to the complex quite tenaciously and is not removed readily. It is believed that the compound Q is complexed to the aryl magnesium chloride in small whole numbers, i.e., 1, 2 or 3 molecules, and not in intermediate numbers. However, since the reaction-product may exist in mixtures of complexes having different numbers of molecules of Q, it is possible that the average number of molecules of Q for each molecule of aryl magnesium chloride may not be a whole number, i.e., 1.5. The precise manner in which the compound Q is complexed is not entirely known. It is presumably complexed as aryl MgCl·Q, but since Grignard reagents are also considered to exist according to the equilibrium:

it is conceivable that the complex of Q may exist as:

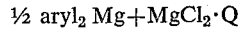

rather than as aryl MgCl·Q. Consequently, when referring to the complex of the invention, it is intended to encompass whichever form may actually exist.

The following examples illustrate ways in which the principle of the invention can be employed, but they are not to be construed as limiting the invention.

*Example 1.—Preparation of phenyl magnesium chloride·tetrahydrofuran complex*

A reaction flask was charged with 24.3 grams (1 gram atom) of magnesium turnings, and purged with nitrogen gas. Ten (10) ml. of tetrahydrofuran was added and followed by an initiation mixture consisting of 2 ml. of ethyl bromide and one crystal of iodine. Reaction set in immediately. To this mixture was added slowly a mixture consisting of 112.5 grams (1 mole) of chlorobenzene and 144.0 grams (2 moles) of tetrahydrofuran, while stirring slowly. During this addition external heating was applied and maintained until the temperature reached about 76° C. Thereafter, the reaction proceeded exothermically, the pot temperature reaching as high as 97° C. The addition of the chlorobenzene/tetrahydrofuran mixture was completed in about an hour, after which the reaction was permitted to continue without external heating. After about an hour and a half of this continued reaction without external heat, external heat was applied for about an hour to help remove the few remaining magnesium chips. After cooling to room temperature, the solution produced was diluted with sufficient tetrahydrofuran to permit easy handling and to provide a suitable volume of titration and the mixture titrated to determine the yield of phenyl magnesium chloride·tetrahydrofuran complex. This yield was 96.8%.

*Example 2.—Preparation of p-chlorophenyl magnesium chloride·tetrahydrofuran complex*

A reaction flask was charged with 24.3 grams (1 gram atom) of magnesium turnings and purged with nitrogen gas. A mixture consisting of 148.0 grams (1 mole) of p-dichlorobenzene dissolved in 219 ml. (2 moles) of tetrahydrofuran was prepared. Twenty (20) ml. of this mixture was added to the magnesium charge, and the reaction initiated with 2 ml. of ethyl bromide and one small iodine crystal. Thereafter the remainder of the p-dichlorobenzene/tetrahydrofuran mixture was added slowly with stirring and no external heating but at reflux until the addition was completed after about an hour, during which the pot temperature reached about 85° C. The heater was then turned on for about two hours, until most of the magnesium chips were used up, the temperature staying around 86° C. during this stage. After cooling to room temperature and diluting with tetrahydrofuran, the reaction mixture was titrated to determine the yield of p-chlorophenyl magnesium chloride·tetrahydrofuran complex. This yield was found to be 90.5%.

*Example 3.—Preparation of dichlorophenyl magnesium chloride·tetrahydrofuran complex*

A reaction flask was charged with 24.3 grams (1 g. atom) of magnesium turnings and purged with nitrogen gas. A mixture consisting of 181.5 grams (1 mole) of pure 1,2,4-trichlorobenzene dissolved in 216.0 grams (3 moles) of tetrahydrofuran was prepared. Twenty (20) ml. of this mixture was added to the magnesium charge and the reaction initiated with 2 ml. of ethyl bromide and one small iodine crystal. Thereafter, the remainder of the trichlorobenzene/tetrahydrofuran mixture was added slowly with stirring and external heat, during which the pot temperature was permitted to reach about 75° C. After nearly all of the magnesium chips had been used up, 200 ml. of tetrahydrofuran was added for thinning and the resulting reaction mixture, after cooling to room temperature, titrated to determine the yield of dichlorophenyl magnesium chloride·tetrahyrofuran complex. This yield was found to be about 30%.

*Example 4.—Preparation of 2,4,5-trichlorophenyl magnesium chloride·tetrahydrofuran complex*

A reaction flask was charged with 24.3 grams (1 g. atom) of magnesium turnings and purged with nitrogen gas. A mixture consisting of 216 grams (1 mole) of 1,2,4,5-tetrachlorobenzene dissolved in 504 grams (7 moles) of tetrahydrofuran was prepared and a small amount of this mixture was added to the charge in the flask in addition to an initiator consisting of 2 ml. of ethyl bromide and a small iodine crystal. The rest of the mixture of tetrachlorobenzene and tetrahydrofuran was then added slowly, while heating to reflux and while stirring, this addition being completed in about five hours, while the pot temperature remained around 70° C. After about another hour, the heat was turned off, but reaction continued. The reaction mixture was then permitted to cool to room temperature and was then diluted with tetrahydrofuran for easy handling. Titration indicated a yield of 58.5% of 2,4,5-trichlorophenyl magnesium chloride·tetrahydrofuran complex.

*Example 5.—Preparation of 2,3,4,5,6-pentachlorophenyl magnesium chloride·tetrahydrofuran complex*

A reaction flask was charged with 24.3 grams (1 g. atom) of magnesium turnings and purged with nitrogen gas. A mixture consisting of 285 grams (1 mole) of hexachlorobenzene slurried in 504 grams (7 moles) of tetrahydrofuran was prepared and 10 ml. of this mixture was added to the charge in the flask in addition to an initiation consisting of 2 ml. of ethyl bromide and a small iodine crystal. The rest of the hexachlorobenzene/tetrahydrofuran slurry mixture was then added slowly while heating to reflux and while stirring, this addition being completed in about six hours, after which the heat was turned off. During the addition, the temperature remained about 67° C. Titration of the reaction mixture cooled to room temperature and thinned with tetrahydrofuran, indicated a yield of 77.5% of 2,3,4,5,6-pentachlorophenyl magnesium chloride·tetrahydrofuran complex.

*Example 6.—Preparation of x-chlorotolyl magnesium chloride·tetrahydrofuran complex*

A reaction flask was charged with 24.3 grams (1 g. atom) of magnesium turnings and purged with nitrogen gas. A mixture consisting of 161 grams (1 mole) of 2,4-dichlorotoluene dissolved in 216 grams (3 moles) of tetrahydrofuran was prepared and a little of this mixture was added to the charge in the flask in addition to an initiator consisting of 2 ml. of ethyl bromide and a small iodine crystal. The rest of the dichlorotoluene/tetrahydrofuran mixture was then added slowly while stirring. External heat was applied at beginning but was turned off since reaction proceeded effectively exothermically. Control of temperature by cooling was required to maintain pot temperature below 85° C. It required about one hour to add all of the dichlorotoluene/tetrahydrofuran mixture. Thereafter, external heat was applied for about two hours, after which the reaction mixture was permitted to cool. This reaction mixture by titrating, after thinning with tetrahydrofuran, indicated a yield of about 83% of x-chlorotolyl magnesium chloride·tetrahydrofuran complex.

*Example 7.—Preparation of o-tolyl magnesium chloride·tetrahydrofuran complex*

A reaction flask was charged with 24.3 grams (1 g. atom) of magnesium turnings and purged with nitrogen gas. A mixture consisting of 126.5 grams (1 mole) of o-chlorotoluene dissolved in 216 grams (3 moles) of tetrahydrofuran was prepared and 10 ml. of this mixture was added to the charge in the flask in addition to an initiator consisting of 2 ml. of ethyl bromide and a small iodine crystal. The rest of the o-chlorotoluene/tetrahydrofuran mixture was then added slowly while stirring, this addition requiring about one hour and a half. During this period, external heat was applied, the pot temperature being maintained about 80° C. After the addition of the o-chlorotoluene/tetrahydrofuran mixture, the application of external heat was continued for about two hours. The reaction mixture was then permitted to cool to room temperature and thinned with tetrahydrofuran for titration. The yield was 98.5% of o-tolyl magnesium chloride·tetrahydrofuran complex.

*Example 8.—Preparation of p-tolyl magnesium chloride·tetrahydrofuran complex*

A reaction flask was charged with 24.3 grams (1 g. atom) of magnesium turnings and purged with nitrogen gas. A mixture consisting of 126.5 grams (1 mole) of p-chlorotoluene dissolved in 216 grams (3 moles) of tetrahydrofuran was prepared and 10 ml. of this mixture was added to the charge in the flask in addition to an initiator consisting of 2 ml. of ethyl bromide and a small iodine crystal. The rest of the p-chlorotoluene/tetrahydrofuran mixture was then added slowly while stirring, this addition requiring about one hour. During this period external heat was applied, the pot temperature reaching 92° C. during this interval. After the addition of p-chlorotoluene/tetrahydrofuran mixture, the application of external heat was continued for about an hour and a half. The reaction mixture was then permitted to cool to room temperature and thinned with tetrahydrofuran for titration. The yield was 93.0% of p-tolyl magnesium chloride-tetrahydrofuran complex.

*Example 9.—Preparation of m-tolyl magnesium chloride·tetrahydrofuran complex*

A reaction flask was charged with 24.3 grams (1 g. atom) of magnesium turnings and purged with nitrogen gas. A mixture of 126.5 grams (1 mole) of m-chlorotoluene dissolved in 216.0 grams (3 moles) of tetrahydrofuran was prepared and 10 ml. of this mixture was added to the charge in the flask in addition to an initiator consisting of 2 ml. of ethyl bromide and a small iodine crystal. The rest of the m-chlorotoluene/tetrahydrofuran mixture was then added slowly while stirring, this addition requiring about an hour. During this period, external heat was applied, the pot temperature being maintained at about 80° C. After the addition of the m-chlorotoluene/tetrahydrofuran mixture, the application of external heat was continued for about two and a half hours. Titration of the reaction mixture after dilution with tetrahydrofuran indicated a yield of about 96.0% of m-tolyl magnesium chloride·tetrahydrofuran complex.

*Example 10.—Preparation of 2-ethoxy phenyl (phenetyl) magnesium chloride·tetrahydrofuran complex*

A reaction flask was charged with 24.3 grams (1 g. atom) of magnesium turnings and purged with nitrogen gas. A mixture consisting of 156.5 grams (1 mole) of o-chlorophenetole dissolved in 216 grams (3 moles) of tetrahydrofuran was prepared and 10 ml. of this mixture was added to the charge in the flask in addition to an initiator consisting of 2 ml. of ethyl bromide and a small iodine crystal. The rest of the o-chlorophenetole/tetrahydrofuran mixture was then added slowly while stirring, this addition requiring about one hour and forty-five minutes. During this period, external heat was applied, the pot temperature reaching 84° C. The application of heat was then continued for about 2 hours. The reaction mixture was then diluted with tetrahydrofuran for titration. The yield was 98.6% of 2-ethoxy phenyl magnesium chloride·tetrahydrofuran complex.

The following standard experimental procedure was used in the following examples. Where the experimental conditions deviated from the standard procedure, it is noted in the description of the experiment.

One g. atom (24.3 grams) of magnesium turnings were charged into a 1,000 ml. 3 neck flask which was then purged with nitrogen. In another flask, a mixture consisting of 1 mole of the aromatic chloride utilized was dissolved in 216.0 grams (3 moles) of tetrahydrofuran. Ten ml. of this mixture was then added to the charge in the 3 neck flask and the reaction was initiated by addition of 2 ml. of ethyl bromide and the addition of a small iodine crystal. After initiation of the reaction, the remainder of the aromatic chloride/tetrahydrofuran mix was slowly added to the 3 neck flask, with constant stirring. The formation of the aromatic magnesium chlorides is usually exothermic. When necessary, external heat was applied to the flask to keep the reaction going at reflux and/or to carry it to completion. At the completion of the reaction, the product was titrated in a standard Gilman titration test to determine the yield of aromatic magnesium chloride.

*Example 11.—o-Chlorophenyl magnesium chloride complex*

One mole (147.0 grams) of o-dichlorobenzene was dissolved in the tetrahydrofuran. The reaction started at 45° C. and attained a maximum temperature of 110° C. The reaction was run for 30 hours. The yield of o-chlorophenyl magnesium chloride·tetrahydrofuran complex was 19%.

*Example 12.—Chlorobiphenylyl magnesium chloride complex*

One mole (257.5 grams) of a chlorinated biphenyl (42% chlorinated biphenyl) (Monsanto's Aroclor 1242) was dissolved in the tetrahydrofuran. The reaction started at 53° C. and attained a maximum temperature of 86° C. The reaction was completed in 5 hours. The yield of chlorobiphenylyl magnesium chloride·tetrahydrofuran complex was about 41%.

*Example 13.—Chloroterphenylyl magnesium chloride complex*

One mole (361.0 grams) of a chlorinated terphenyl (60% chlorinated terphenyl) (Aroclor 5460) was dissolved in the tetrahydrofuran. The reaction started at 50° C. and attained a maximum temperature of 82° C. The reaction was completed in 4 hours. The yield of chloroterphenylyl magnesium chloride·tetrahydrofuran complex was 49.5%.

*Example 14.—Chlorobiphenylyl magnesium chloride complex*

One mole (326.5 grams) of a chlorinated biphenyl (54% chlorinated biphenyl) (Aroclor 1254) was dissolved in the tetrahydrofuran. The reaction started at 51° C. and attained a maximum temperature of 90° C. The reaction was completed in 5 hours and 20 minutes. The yield of chlorobiphenylyl magnesium chloride·tetrahydrofuran complex was 30.4%.

*Example 15.—Chlorobiphenylyl magnesium chloride complex*

One mole (232.7 grams) of a chlorinated biphenyl (68% chlorinated biphenyl) (Aroclor 1268) was dissolved in the tetrahydrofuran. The reaction started at 62° C. and attained a maximum temperature of 77° C. The reaction was completed in 3 hours and 20 minutes. The yield of chlorobiphenylyl magnesium chloride tetrahydrofuran complex was 80.8%.

*Example 16.—Biphenylyl magnesium chloride complex*

One mole (188.5 grams) of a chlorinated biphenyl (21% chlorinated biphenyl) (Aroclor 1221) was dissolved in the tetrahydrofuran. The reaction started at 43.5° C. and attained a maximum temperature of 77° C. The reaction was essentially completed in 18 hours. The yield of biphenylyl magnesium chloride·tetrahydrofuran complex was 22.6%.

*Example 17.—3,5-dichlorophenyl magnesium chloride complex*

One mole (181.5 grams) of 1,3,5-trichlorobenzene was dissolved in the tetrahydrofuran. The reaction started at 47° C. and attained a maximum temperature of 86° C. The reaction was completed in 3 hours. The yield of 3,5-dichlorophenyl magnesium chloride·tetrahydrofuran complex was 33.6%.

*Example 18.—Alpha-naphthyl magnesium chloride complex*

One mole (162.5 grams) of alpha-chloronaphthalene was dissolved in the tetrahydrofuran. The reaction started at 49° C. and attained a maximum temperature of 80° C. The reaction was completed in 8 hours and 45 minutes. The yield of alpha-naphthyl magnesium chloride·tetrahydrofuran complex was 40.4%.

*Example 19.—Chloro-ethoxyphenyl magnesium chloride complex*

The 1,000 ml. flask was charged with 12.7 grams (0.523 g. atoms) of magnesium turnings. One hundred grams (0.523 mole) of 2,4-dichlorophenetole were dissolved in 144.0 grams (2 moles) of tetrahydrofuran. The reaction started at 45° C. and attained a maximum temperature of 79° C. The reaction was completed in 3 hours. The yield of chloro-ethoxyphenyl magnesium chloride·tetrahydrofuran complex was 90.4%.

*Example 20.—p-Ethylphenyl magnesium chloride complex*

One mole (140.6 grams) of 1-chloro-4-ethylbenzene chloride was dissolved in the tetrahydrofuran. The reaction started at 42° C. and attained a maximum temperature of 83° C. The reaction was completed in 8 hours and 25 minutes. The yield of p-ethylphenyl magnesium chloride·tetrahydrofuran complex was 97.2%.

*Example 21.—o-Fluorophenyl magnesium chloride complex*

Eighteen and six tenths (18.6) grams (0.766 g. atoms) of magnesium were charged into the 1,000 ml. flask. One hundred (100.0) grams (0.766 mole) of o-fluorochlorobenzene were dissolved in 180 grams (2.5 moles) of tetrahydrofuran. The reaction started at 45° C. and attained a maximum temperature of 76.5° C. The reaction was completed in 29 hours. The yield of o-fluorophenyl magnesium chloride·tetrahydrofuran complex was 7.3%.

*Example 22.—p-Diethylaminophenyl magnesium chloride complex*

Thirteen and two-tenths (13.2) grams (0.545 g. atoms) of magnesium were charged into the 1,000 ml. flask. One hundred (100) grams (0.545 mole) of p-diethylaminochlorobenzene were dissolved in 144.0 grams (2 moles) of tetrahydrofuran. The reaction started at 45° C. and attained a maximum temperature of 82.5° C. The reaction was completed in 11 hours and 20 minutes. The yield of p-diethylaminophenyl magnesium chloride·tetrahydrofuran complex was 95.6%.

*Example 23.—m-Fluorophenyl magnesium chloride complex*

Nine and three-tenths (9.3) grams (0.383 g. atoms) of magnesium were charged in the 1,000 ml. flask. Fifty (50.0) grams (0.383 mole) of 1-chloro-3-fluorobenzene were dissolved in 90 grams (1.25 moles) of tetrahydrofuran. The reaction started at 53° C. and attained a maximum temperature of 77° C. The reaction was completed in 5 hours and 30 minutes. The yield of m-fluorophenyl magnesium chloride·tetrahydrofuran complex was 50.4%.

*Example 24.—p-Phenylene-bis-magnesium chloride complex*

Two g. atoms (48.6 grams) of magnesium were charged in the 1,000 ml. flask. One mole (147.0 grams) of p-dichlorobenzene were dissolved in 288 grams (4 moles) of tetrahydrofuran. The reaction started at 60° C. and attained a maximum temperature of 82° C. The reaction was completed in 32 hours. Based on a Gilman titration, there was produced a mixture of p-phenylene-bis-magnesium chloride·tetrahydrofuran complex and p-chlorophenyl magnesium chloride·tetrahydrofuran complex.

*Example 25.—Tetrachloroethylphenyl magnesium chloride complex*

One-half mole (130.2 grams) of pentachloroethylbenzene were dissolved in 144 grams (2 moles) of tetrahydrofuran. Twelve and two-tenths (12.2) grams (0.5 mole) of magnesium turnings were used. The reaction began to reflux at 76° C. and the reaction attained a maximum temperature of 81° C. The reaction was completed in 1 hour and 50 minutes. The yield of tetrachloroethylphenyl magnesium chloride·tetrahydrofuran complex was 48.7%.

*Example 26.—p-Xylyl-2-magnesium chloride complex*

One mole (141.5 grams) of 2-chloro-p-xylene were dissolved in the tetrahydrofuran. An iodine crystal was not used. The reaction attained a maximum temperature of 89° C. It was completed in 4 hours and 25 minutes. The yield of p-xylyl-2-magnesium chloride·tetrahydrofuran complex was 100%. In a second experiment, a yield of 92.5% was obtained with a 2 hour and 25 minute reaction time.

*Example 27.—Mixed Grignard of p-chloro- and p-fluorotoluene complex*

One-half mole (55 grams) of p-fluorotoluene together with 0.5 mole (63.3 grams) of p-chlorotoluene were dissolved in the tetrahydrofuran. The reaction mixture refluxed at 76°–78° C. The reaction was stopped after 12 hours and 30 minutes. The yield of the mixed Grignard complex was 52% and 55% (results of two different titrations).

*Example 28.—Mixed Grignard of o-chloro- and o-fluorotoluene complex*

The experimental conditions were almost a duplicate of the previous example, employing o-chlorotoluene and o-fluorotoluene instead of the corresponding para isomers. The yield of the mixed Grignard was 51%.

*Example 29.—Chloronaphthyl magnesium chloride complex*

Dichloronaphthalene (24.3 grams) was dissolved in the tetrahydrofuran. The reaction was initiated, refluxed at about 75° C., and allowed to continue for almost 3 hours. The yield of chloronaphthyl magnesium chloride·tetrahydrofuran complex, based on titration, was 43%. The yield based on the magnesium consumed was 90%, indicating that coupling might have occurred.

*Example 30.—Phenyl magnesium chloride complex*

One-half mole (56.3 grams) of chlorobenzene was dissolved in 1.5 moles (129.1 grams) of tetrahydropyran. The 3 neck flask was charged with 0.5 g. atom (12.2 grams) of magnesium. The mixture refluxed at about 90° C. The reaction was completed in 12 hours. The yield of phenyl magnesium chloride·tetrahydropyran complex was 96%.

*Example 31.—Phenyl magnesium chloride complex*

One-half mole (56.3 grams) of chlorobenzene was dissolved in 1.5 moles (129 grams) of 2-methyl tetrahydrofuran instead of in tetrahydrofuran. One-half g. atom (12.2 grams) of magnesium was charged into a 3 neck flask. The reaction was completed in 12 hours. The yield of phenyl magnesium chloride·2-methyl tetrahydrofuran complex was 97%.

*Example 32.—Phenyl magnesium chloride complex*

One-half mole (56.3 grams) of chlorobenzene was dissolved in 1.5 moles (195.5 grams) of tetrahydrofurfuryl ethyl ether instead of in tetrahydrofuran. One-half gram atom (12.2 grams) of magnesium was charged into the three neck flask. The reaction was controlled between about 80° and 97° C. The run was completed in 13 hours. The yield of phenyl magnesium chloride·tetrahydrofurfuryl ethyl ether complex was 77%.

In the following examples a crystal of iodine was added to the magnesium turnings in the flask and 1 or 2 ml. of ethyl bromide added to the reaction mixture for initiation.

*Example 33.—p-Trifluoromethylphenyl magnesium chloride complex*

Six and one-tenth (6.1) grams (0.25 g. atom) of magnesium were charged into a 500 ml. flask. Thirty-five and six-tenths (35.6 grams) (0.25 mole) of p-chlorobenzotrifluoride were dissolved in 90.0 grams (1.25 moles) of tetrahydrofuran. The reaction started at 46° C. and attained a maximum temperature of 71° C. The reaction was completed in 5 hours. The yield of p-trifluoromethylphenyl magnesium chloride·tetrahydrofuran complex was 9.1%.

*Example 34.—m-Trifluoromethylphenyl magnesium chloride complex*

Six and one-tenth (6.1) grams (0.25 g. atom) of magnesium were charged into a 500 ml. flask. Thirty-five and six-tenths (35.6) grams (0.25 mole) of m-chlorobenzotrifluoride were dissolved in 72.0 grams (1.0 mole) of tetrahydrofuran. The reaction started at 51° C. and attained a maximum temperature of 72° C. The reaction was completed in 4 hours and 30 minutes. The yield of m-trifluoromethylphenyl magnesium chloride·tetrahydrofuran complex was 5.7%.

*Example 35.—p-(Trimethylsilyl) phenyl magnesium chloride complex*

One-half mole (92.5 grams) of trimethyl-p-chlorophenyl silane was dissolved in 108 grams of tetrahydrofuran. Twenty-five ml. of this solution were added to a 500 ml. flask containing 14.6 grams (0.6 g. atoms) of magnesium turnings and a crystal of iodine. The reaction mixture was stirred and heated to reflux. Then 1 ml. of ethyl bromide was added. The reaction seemed to initiate but it was not sustaining outside heating. The remainder of the trimethyl-p-chlorophenyl silane/tetrahydrofuran mixture was added drop-wise while the reaction mixture was maintained at reflux. After completion of the addition, the reaction mixture was refluxed for 2 hours and then allowed to cool. The solution was black and the magnesium turnings were badly attacked. Sixty-one and one-tenth (61.1) grams (0.6 mole) of trimethyl chlorosilane in 100 ml. of ether were added to the reaction mixture. Reflux commenced and an insoluble white salt formed. The mixture was refluxed for 2 hours after the addition was completed and allowed to stand overnight. The reaction mixture was hydrolyzed by being poured into 200 ml. of dilute hydrochloric acid solution. The layers were separated and the organic solvents were combined, dried on sodium sulphate, filtered and the solvent removed by distillation. The yield of p-bis-(trimethylsilyl) benzene was 68%.

*Example 36.—o-Trifluoromethylphenyl magnesium chloride complex*

Three gram atoms (73 grams) of magnesium were charged into a 3 neck flask. o-Chlorobenzotrifluoride (455.8 grams) was dissolved in 7.56 moles (614 ml.) of tetrahydrofuran. The reaction mixture refluxed at 74°

C. The reaction was stopped after 8 hours and 20 minutes. The yield of o-trifluoromethylphenyl magnesium chloride·tetrahydrofuran complex was 63.6%.

*Example 37.—Phenyl magnesium chloride complex*

One mole (112.5 grams) of chlorobenzene was added to a flask containing 1 g. atom (24.3 grams) of magnesium turnings and 1 iodine crystal. 2-ethoxy tetrahydropyran (390 grams—3 moles) was added (instead of tetrahydrofuran) and the reaction initiated with 2 ml. of ethyl bromide. The reaction was stopped in 4 hours. The yield of phenyl magnesium chloride·2 ethoxy tetrahydropyran complex was 51.5%.

*Example 38.—p-Chlorophenyl magnesium chloride complex*

One-half gram atom (12.2 grams) of magnesium and 1 iodine crystal were charged into a 3 neck flask. One-half mole (74 grams) of p-dichlorobenzene was dissolved in 1.5 moles (129.1 grams) of tetrahydropyran (instead of tetrahydrofuran). The reaction mixture refluxed at 96° C. The total reaction time was 8 hours. The yield of p-chlorophenyl magnesium chloride·tetrahydropyran complex was 83.1%.

*Example 39.—p-Chlorophenyl magnesium chloride complex*

Following the procedure of the preceding example 1.5 moles (129 grams) of 2-methyl tetrahydrofuran were used instead of tetrahydropyran. The mixture refluxed at 89° C. The total reaction time was 8 hours. The yield of p-chlorophenyl magnesium chloride·2-methyl tetrahydrofuran complex was 86%.

*Example 40.—p-Chlorophenyl magnesium chloride complex*

Following the procedure of Example 24, 1.5 moles (195.5 grams) of tetrahydrofurfuryl ethyl ether were used instead of tetrahydrofuran. The reaction was stopped in 3 hours. The yield of p-chlorophenyl magnesium chloride·tetrahydrofurfuryl ethyl ether complex was 62%.

*Example 41.—p-Methoxyphenyl magnesium chloride complex*

Three moles (427.8 grams) of p-chloroanisole were dissolved in 9 moles of tetrahydrofuran. Three gram atoms of magnesium were used. The reaction refluxed between 63° C. and 75° C. The reaction was completed in 7 hours. The yield of p-methoxyphenyl magnesium chloride·tetrahydrofuran complex was 87.6%.

*Example 42.—Grignard of 1,2,4-trichlorobenzene complex*

One-half mole (90.7 grams) of 1,2,4-trichlorobenzene was dissolved in 1.5 moles of 2-methyl tetrahydrofuran, instead of in tetrahydrofuran. One-half gram atom of magnesium was used. The reaction was stopped after 8 hours. The yield of the Grignard·2-methyl tetrahydrofuran complex was 20%.

*Example 43.—p-Chlorophenyl magnesium chloride complex*

One-half mole (74 grams) of p-dichlorobenzene was dissolved in 1.5 moles (126 grams) of dihydropyran, instead of in tetrahydrofuran. A small amount of the p-dichlorobenzene/dihydropyran mixture was added to a flask containing ½ mole (12.2 grams) of magnesium and the reaction initiated. After the reaction started the remainder of the mix was slowly added to the reaction flask. The yield of p-chlorophenyl magnesium chloride·dihydropyran complex was 25%.

*Example 44.—p-Dimethylaminophenyl magnesium chloride complex*

Twenty-five ml. of a solution of 311.0 grams (2 moles) of p-chlorodimethylaniline in 432 grams (6 moles) of tetrahydrofuran, was added to a flask containing 48.7 grams (2 g. atoms) of magnesium turnings. The reaction was initiated by heating to reflux and then adding 1 ml. of ethyl bromide at reflux. The mix was held at reflux for 3½ hours and allowed to stand over-night. The yield of p-dimethylaminophenyl magnesium chloride·tetrahydrofuran complex was 82%.

*Example 45.—Phenyl magnesium chloride complex*

A solution of 1 mole of chlorobenzene in 3 moles (237 grams) of N-methylmorpholine (instead of tetrahydrofuran) was added to 1 g. atom of magnesium and the reaction initiated. The reaction was principally maintained at about 60° C. occasionally rising to 68° C., for about 6 hours. The yield of phenyl magnesium chloride·N-methylmorpholine complex was 55%, based on the magnesium consumed.

*Example 46.—Di-Grignard complex of 1,1-bis-(p-chlorophenyl) ethylene*

To 24.3 grams (1 g. atom) of magnesium turnings was added 1 ml. of ethyl bromide and 30 ml. of a mixture prepared from 124.5 grams (0.5 mole) of 1,1-bis-(p-chlorophenyl) ethylene and 216.0 grams (3.0 moles) of tetrahydrofuran. When the reaction began, the remainder of the 1,1-bis-(p-chlorophenyl) ethylene/tetrahydrofuran mixture was added while maintaining the mixture at a temperature of 72° C. over a period of 1½ hours. After this addition, refluxing was continued for an additional period of 5 hours. Based upon Gilman titration a 30% yield of complex was obtained.

*Example 47.—Dichlorophenyl magnesium chloride complex*

To 24.3 grams (1 g. atomic weight) of magnesium turnings was added 2 ml. of ethyl bromide, 1 crystal of iodine, and 10 ml. of a mixture prepared by adding 181.5 grams (1 mole) of 1,2,3-trichlorobenzene and 216.3 grams (3 moles) of tetrahydrofuran. The temperature of the resulting mixture rose to 55° C. and the remainder of the 1,2,3-trichlorobenzene/tetrahydrofuran mixture was added over a period of about 1½ hours maintaining the temperature of the reaction mixture between about 40 and 80° C. Refluxing was continued for 5 hours after the addition was complete. The yield of dichlorophenyl magnesium chloride·tetrahydrofuran complex was 27.8%, based upon Gilman titration.

*Example 48.—p-Vinylphenyl magnesium chloride complex*

A reactor was charged with 9.7 grams (0.4 g. atom) of magnesium and 3 ml. of ethyl bromide and 5 ml. of tetrahydrofuran. The reaction of the magnesium initiated immediately and the temperature rose to about 60° C. A separately prepared mixture of 27.6 grams of p-chlorostyrene and 50 ml. of tetrahydrofuran was introduced to the reaction mixture drop-wise over a period of 35 minutes at a rate sufficient to maintain gentle reflux. The vapor temperature rose to about 78–82° C. After this addition, refluxing was continued for 15 minutes and then the mixture was stirred for 45 minutes without heating. The product was p-vinylphenyl magnesium chloride·tetrahydrofuran complex.

*Example 49.—m-Chlorophenylmagnesium chloride complex*

To a mixture of 12.2 grams (0.5 g. atom) of magnesium turnings and 2 ml. of diethyl ether was added a small crystal of iodine and 2 ml. of ethyl bromide. To this initiated mixture was added drop-wise a solution of 108.0 grams (1.5 moles) containing 72.0 grams (0.5 mole) of m-dichlorobenzene in tetrahydrofuran over a period of about one hour. After the addition, the mixture was refluxed for a further period of one hour. The yield of m-chlorophenylmagnesium chloride·tetrahydrofuran complex was 73%.

Example 50.—Trichlorophenyl magnesium chloride complex

About 12.2 grams (0.5 g. atom) of magnesium metal was initiated with the aid of 2 ml. of ethyl bromide, one small crystal of iodine and 2 ml. of diethyl ether. Immediately after initiation was added drop-wise a solution of 108 grams (0.5 mole) of 1,2,3,4-tetrachlorobenzene in 108 grams of tetrahydrofuran over a period of about 1½ hours. The mixture was refluxed for an additional hour after the addition. The yield of trichlorophenyl magnesium chloride·tetrahydrofuran complex was 83.8%, based on the unreacted magnesium metal recovered.

As those skilled in the art will appreciate, other complexing compounds Q may be employed in the foregoing examples as well as other aryl chlorides.

As noticed above, the aryl magnesium chloride complexes of this invention are very useful "tools" to the organic chemist in that they may be used to prepare many compounds, a good number of which are old and have been used for a time.

Various reactions wherein the present aryl magnesium chloride complexes may be used are presented in the equations below:

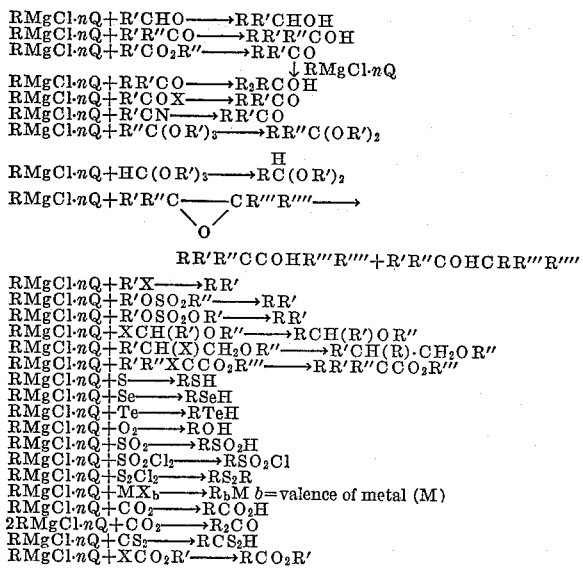

In these equations, R is an aryl radical as defined above and R', R", R''' and R'''' are hydrocarbon groups, e.g., aliphatic, cycloaliphatic, aromatic or heterocyclic groups, X is fluorine, chlorine, bromine or iodine and M is a metal or metalloid from one of the following groups of the periodic table: Ib, IIb, III, IV, V, VI, VII and VIII, n is a small indeterminate number of 1 or more, and Q has the significance ascribed to it above.

Of the many compounds having wide utility that may be made using the present Grignard reagents, may be mentioned benzoic acid which is made from the phenyl magnesium chloride·tetrahydrofuran complex of Example 1 by reaction with $CO_2$. This acid and its sodium salt is widely used in the food industry as a food preservative. Tolyl mercaptan may be made from the p-tolyl magnesium chloride·tetrahydrofuran complex by the reaction with sulfur. The tolyl mercaptan is used to increase the floatability of Paris green on water for killing the anopheline larvae. Phenol which may be made from the complex of Example 1 by reaction with $O_2$, is a well known antiseptic and germicide. Tetraphenyltin made from the reaction of the phenylmagnesium chloride·tetrahydrofuran complex and $SnCl_4$ is useful as a stabilizer for transformer oils. Benzophenone made by the reaction of the phenylmagnesium chloride·tetrahydrofuran complex and phenyl nitrile or benzoyl chloride is useful in soap perfumery as a fixative and for its rose odor.

The arylmagnesium chlorides of this invention are useful as ester interchange catalysts in preparing polyesters by condensing diesters of dicarboxylic acids and polyhydroxy compounds. The polyesters so formed are used to spin valuable fibers. These aryl magnesium chlorides are also useful as Ziegler condensation catalysts for the polymerization of ethylene to form polyethylenes. The latter, in film or sheet form, are widely used in the packaging industry.

While the invention has been described with particular reference to specific embodiments, it is to be understood that it is not limited thereto but is to be construed broadly and restricted solely by the scope of the appended claims.

We claim:

1. A process for producing a solution of a complex of arylmagnesium chloride and a cyclic ether which comprises reacting a carbocyclic aryl chloride containing up to three carbocyclic rings and at least an equimolecular amount of a cyclic ether, with magnesium, said cyclic ether having between 5 and 6 whole members, inclusive, in the ring with at least one hydrogen atom attached to each carbon atom in the ring, and having the formula:

wherein X is a member selected from the class consisting of methylene and the group =NR'', wherein R'' is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR'', the ring shall contain 6 members and X and O shall be in a position 1:4 with respect to each other.

2. A process according to claim 1 wherein the molecular amount of cyclic ether is in excess of a 1:1 ratio to the molecular amount of aryl chloride.

3. A process according to claim 1 wherein the molecular amount of cyclic ether is in about 3:1 ratio to the molecular amount of aryl chloride.

4. A process according to claim 1 wherein the cyclic ether is 2-methyltetrahydrofuran.

5. A process according to claim 1 wherein the cyclic ether is dihydropyran.

6. A process according to claim 1 wherein the cyclic ether is tetrahydrofurfuryl ethyl ether.

7. A process according to claim 1 wherein the cyclic ether is tetrahydrofuran.

8. A process according to claim 7 wherein the aryl chloride is phenyl chloride.

9. A process according to claim 7 wherein the aryl chloride is tolyl chloride.

10. A process according to claim 7 wherein the aryl chloride is vinyl phenyl chloride.

11. A process according to claim 7 wherein the aryl chloride is chlorophenyl chloride.

12. A process according to claim 7 wherein the aryl chloride is biphenyl chloride.

13. A process according to claim 7 wherein the aryl chloride is diethylaminophenyl chloride.

14. A process according to claim 7 wherein the aryl chloride is trimethylsilylphenyl chloride.

15. A solution of a complex of a carbocyclic arylmagnesium chloride containing up to three carbocyclic rings and at least an equimolecular amount of a cyclic ether; said cyclic ether having between 5 and 6 whole members, inclusive, in the ring with at least one hydrogen atom attached to each carbon atom in the ring, and having the formula:

wherein X is a member selected from the class consisting of methylene and the group =NR", wherein R" is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR", the ring shall contain 6 members and X and O shall be in a position 1:4 with respect to each other; said complex being dissolved in said cyclic ether.

16. The composition of claim 15 in which the cyclic ether is tetrahydrofuran and the aryl chloride is phenyl chloride.

17. The composition of claim 15 in which the cyclic ether is tetrahydrofuran and the aryl chloride is tolyl chloride.

18. The composition of claim 15 in which the cyclic ether is tetrahydrofuran and the aryl chloride is vinylphenyl chloride.

19. The composition of claim 15 in which the cyclic ether is tetrahydrofuran and the aryl chloride is chlorophenyl chloride.

20. The composition of claim 15 in which the cyclic ether is tetrahydrofuran and the aryl chloride is biphenyl chloride.

21. The composition of claim 15 in which the cyclic ether is tetrahydrofuran and the aryl chloride is diethylaminophenyl chloride.

22. The composition of claim 15 in which the cyclic ether is tetrahydrofuran and the aryl chloride is trimethylsilylphenyl chloride.

References Cited in the file of this patent

UNITED STATES PATENTS

| | | |
|---|---|---|
| 2,703,325 | Speeter | Mar. 1, 1955 |
| 2,795,628 | Ramsden | June 11, 1957 |

FOREIGN PATENTS

| | | |
|---|---|---|
| 779,100 | Great Britain | July 17, 1957 |

OTHER REFERENCES

Gilman et al.: Rec. trav. Chim., vol. 46, 1927, pages 463–472.

Coates: Organo Metallic Compounds, February 1956, N.Y., Wiley, pages 26–28.